United States Patent
Shitama et al.

(10) Patent No.: US 11,031,176 B2
(45) Date of Patent: Jun. 8, 2021

(54) REACTOR

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Seiji Shitama, Mie (JP); Akinori Ooishi, Mie (JP); Hajime Kawaguchi, Mie (JP); Junji Ido, Mie (JP); Takashi Misaki, Mie (JP); Kohei Yoshikawa, Mie (JP); Shinichiro Yamamoto, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 288 days.

(21) Appl. No.: 16/105,445

(22) Filed: Aug. 20, 2018

(65) Prior Publication Data
US 2019/0057810 A1 Feb. 21, 2019

(30) Foreign Application Priority Data
Aug. 21, 2017 (JP) .............................. JP2017-158928

(51) Int. Cl.
*H01F 27/24* (2006.01)
*H01F 27/40* (2006.01)
(Continued)

(52) U.S. Cl.
CPC .......... *H01F 27/402* (2013.01); *G01K 1/143* (2013.01); *H01F 27/24* (2013.01); *H01F 27/28* (2013.01);
(Continued)

(58) Field of Classification Search
CPC ........ H01F 27/402; H01F 27/28; H01F 27/24; H01F 27/324; H01F 2027/406; H01F 37/00; G01K 1/143
See application file for complete search history.

(56) References Cited

U.S. PATENT DOCUMENTS

2004/0145437 A1\* 7/2004 Lee .................... H05B 6/662
336/55
2013/0314964 A1\* 11/2013 Yoshikawa ........... H01F 27/324
363/131
(Continued)

FOREIGN PATENT DOCUMENTS

| JP | 2015-053395 A | 3/2015 |
| JP | 2016-082042 A | 5/2016 |
| JP | 2016-127760 A | 11/2016 |

*Primary Examiner* — Mang Tin Bik Lian
(74) *Attorney, Agent, or Firm* — Honigman LLP

(57) ABSTRACT

Provided is a reactor that can prevent a temperature sensor from being attached to a wound portion of a coil in a wrong direction. The reactor includes a temperature sensor having a sensor main portion attached to an outer peripheral surface of a wound portion and a wire extending from the sensor main portion. A sensor housing portion houses the sensor main portion. The sensor main portion has a detection surface facing the wound portion and a projecting portion protruding from a back surface of the sensor main portion opposite of the detection surface. The sensor housing portion has a pair of side wall portions opposing respective side surfaces of the sensor main portion. A height of a portion of the sensor main portion that has the projecting portion is larger than a width of that portion and larger than the distance between the side wall portions.

10 Claims, 7 Drawing Sheets

(51) Int. Cl.
*H01F 27/28* (2006.01)
*G01K 1/143* (2021.01)
*H01F 37/00* (2006.01)

(52) U.S. Cl.
CPC ....... *H01F 37/00* (2013.01); *H01F 2027/406* (2013.01)

(56) References Cited

U.S. PATENT DOCUMENTS

2014/0292456 A1* 10/2014 Suzuki .................. H01F 27/263
 336/55
2016/0125996 A1* 5/2016 Ko .......................... H01F 27/08
 336/60
2018/0364108 A1* 12/2018 Tanaka .................... B60L 58/24

* cited by examiner

【FIG. 1】
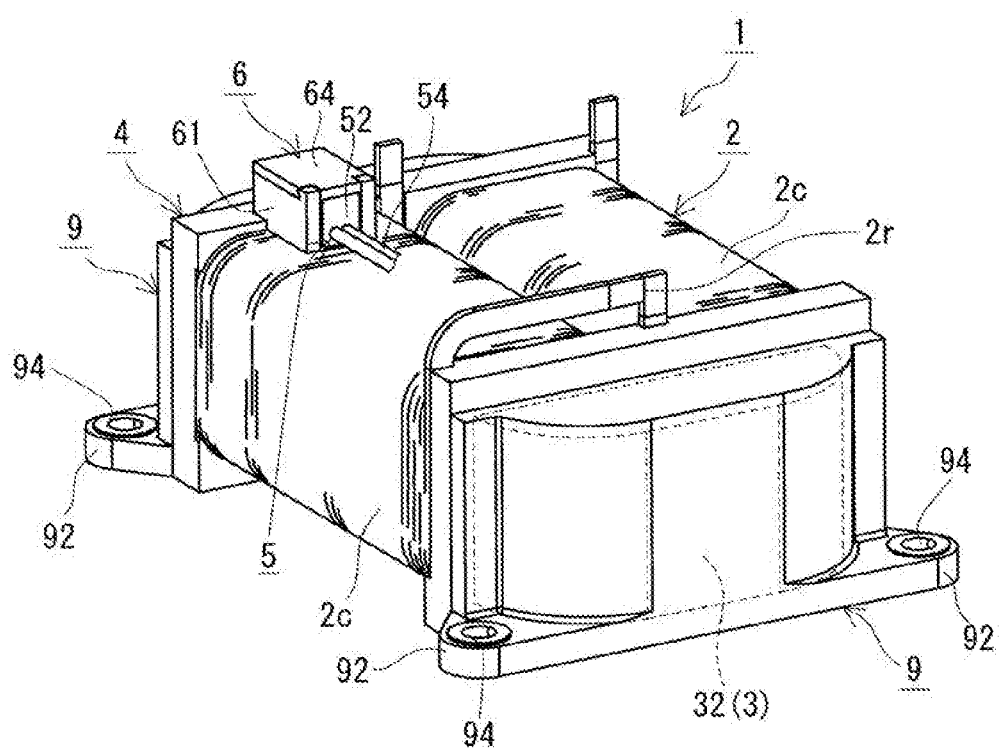

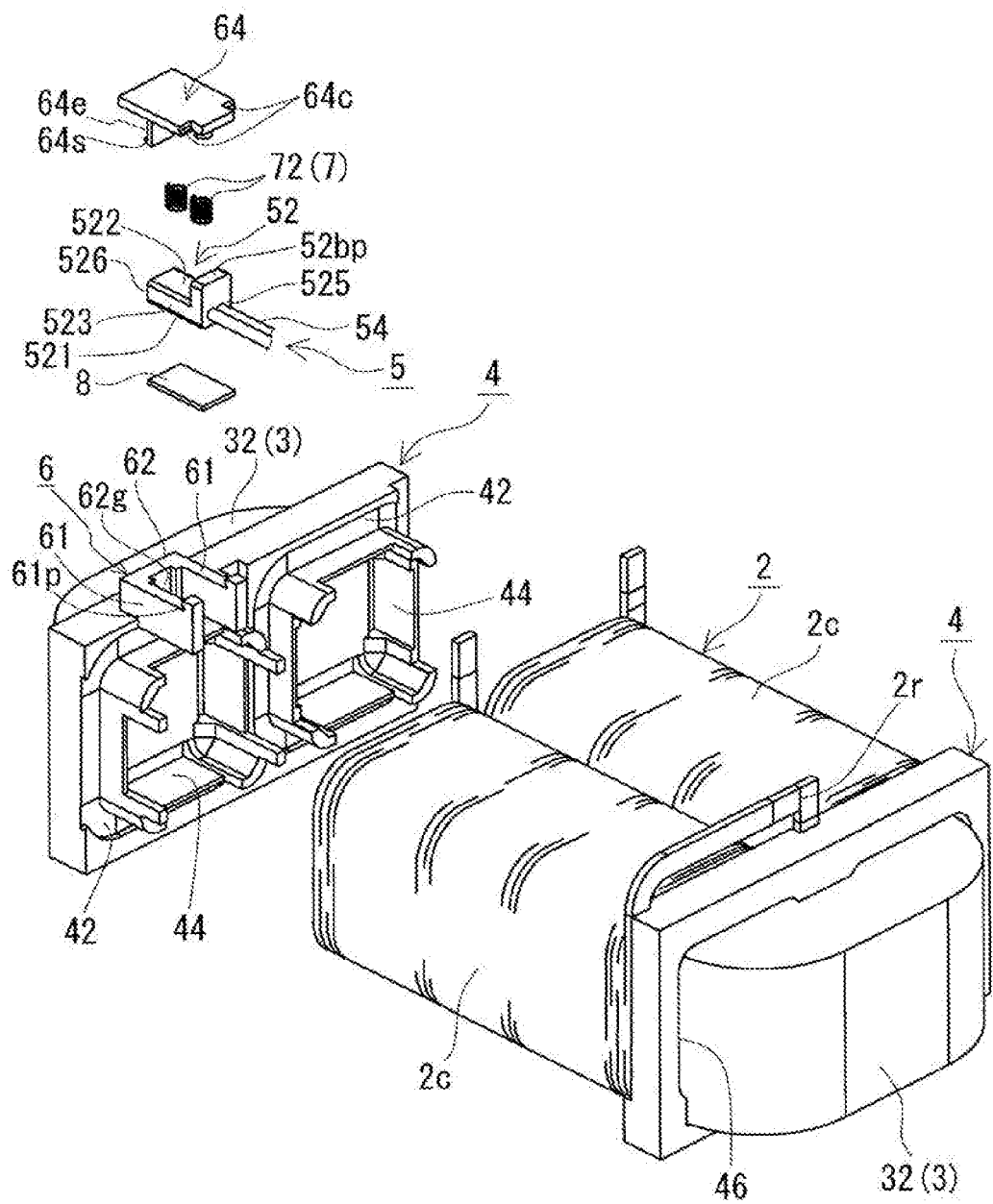
[FIG. 2]

[FIG. 3]
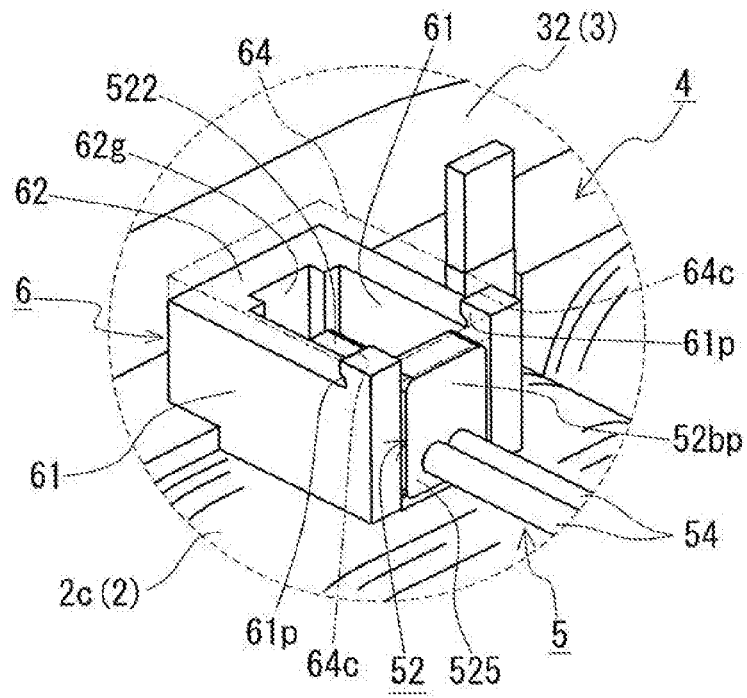
[FIG. 4]
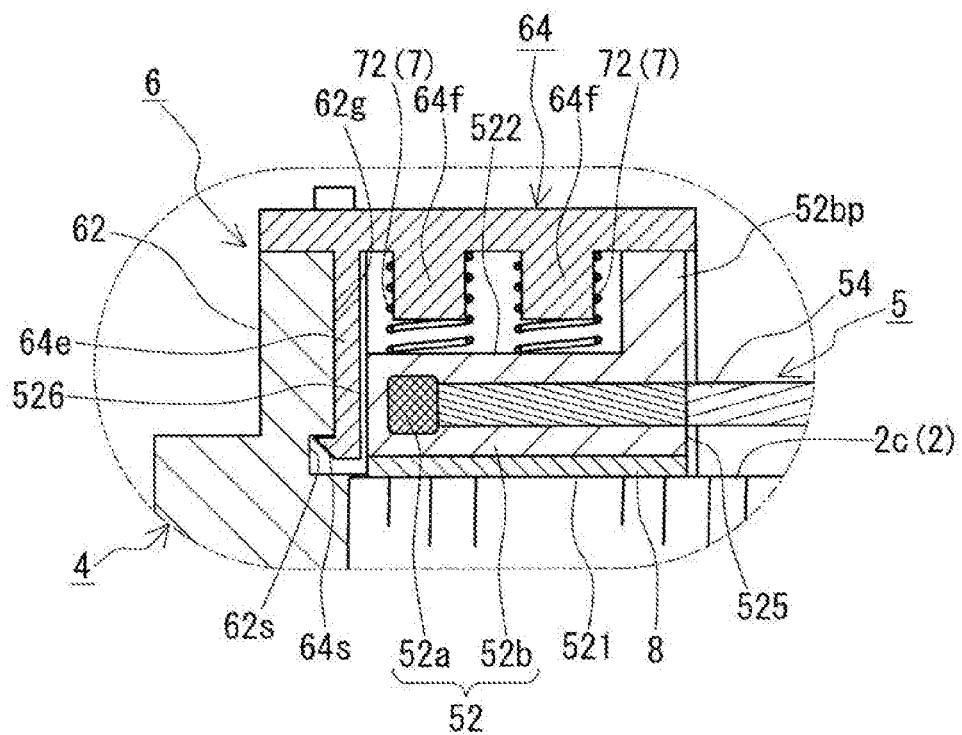

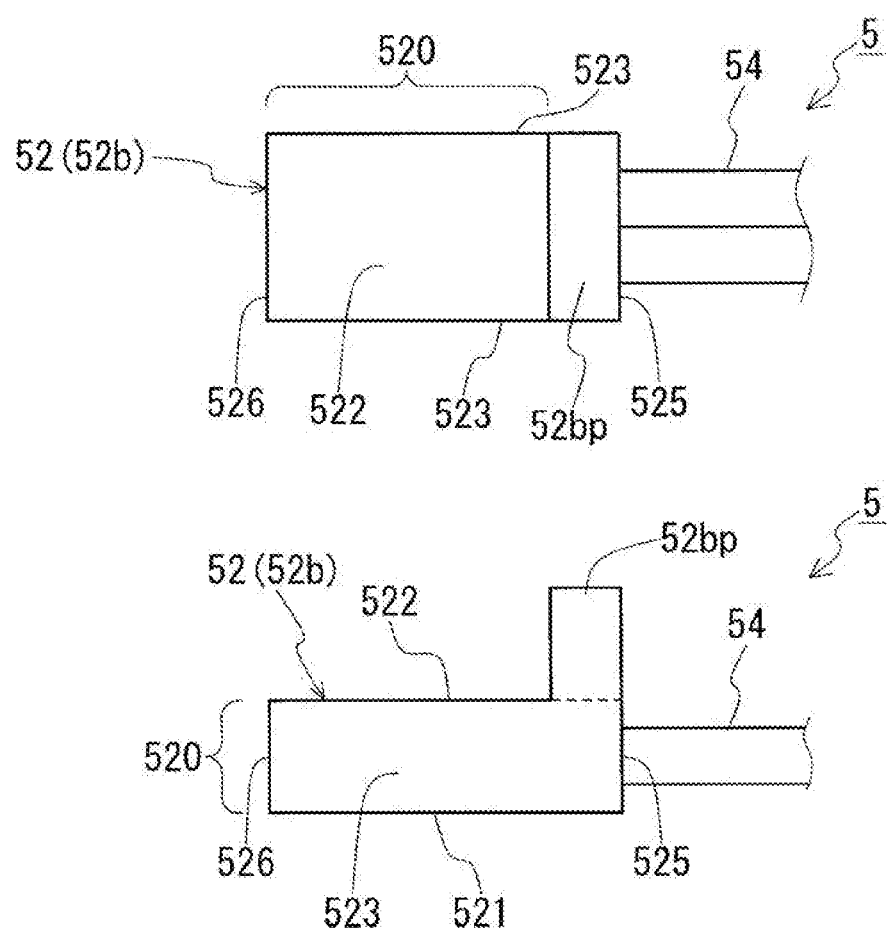
【FIG. 5】

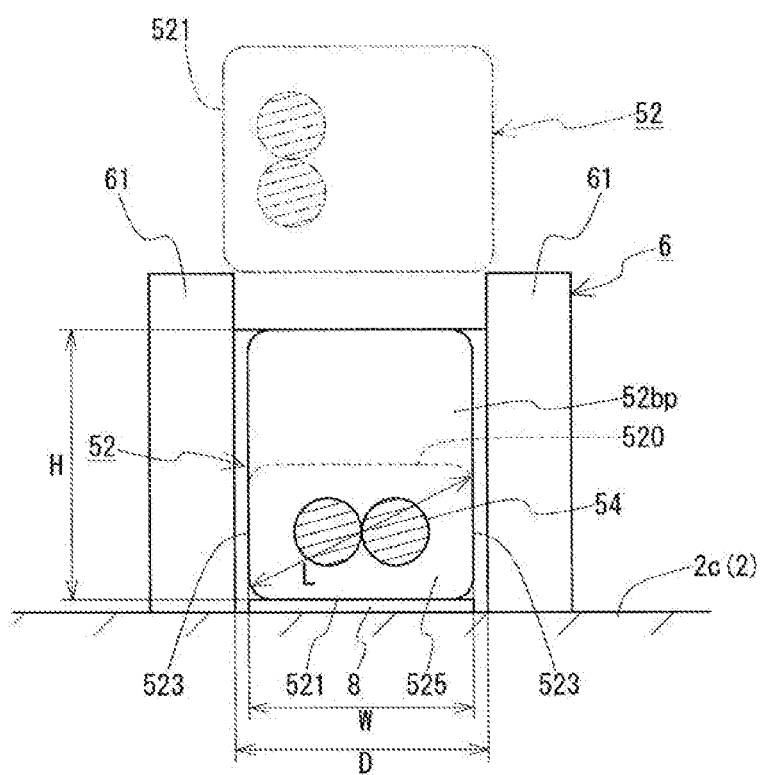
[FIG. 6]

【FIG. 7】
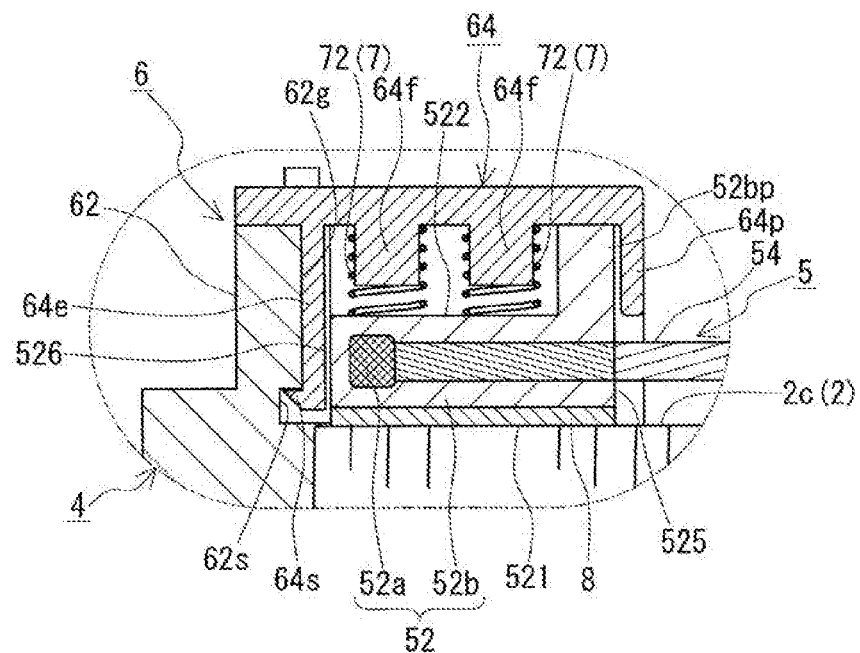
【FIG. 8】
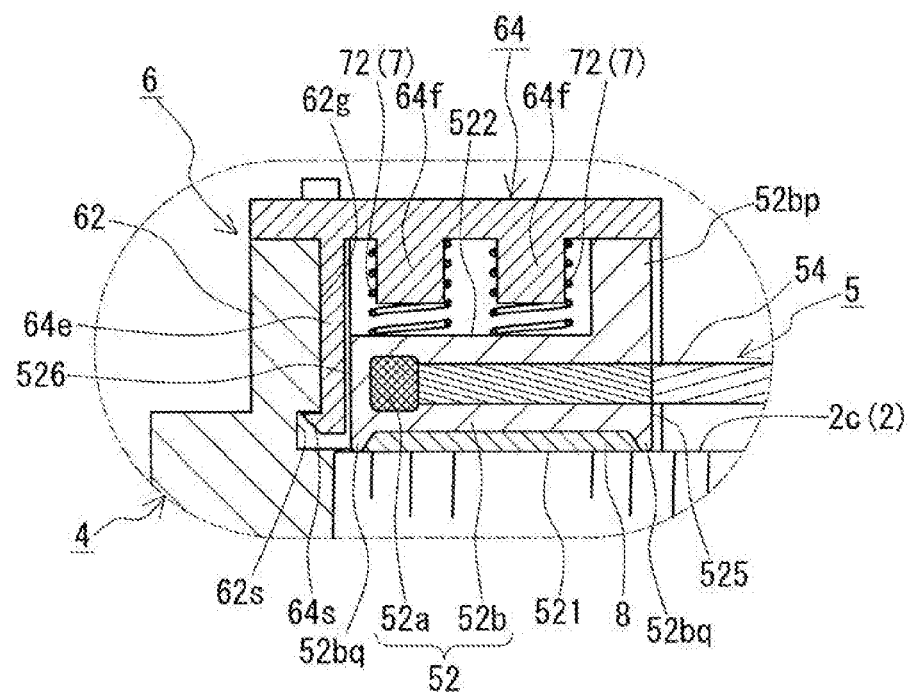

[FIG. 9]
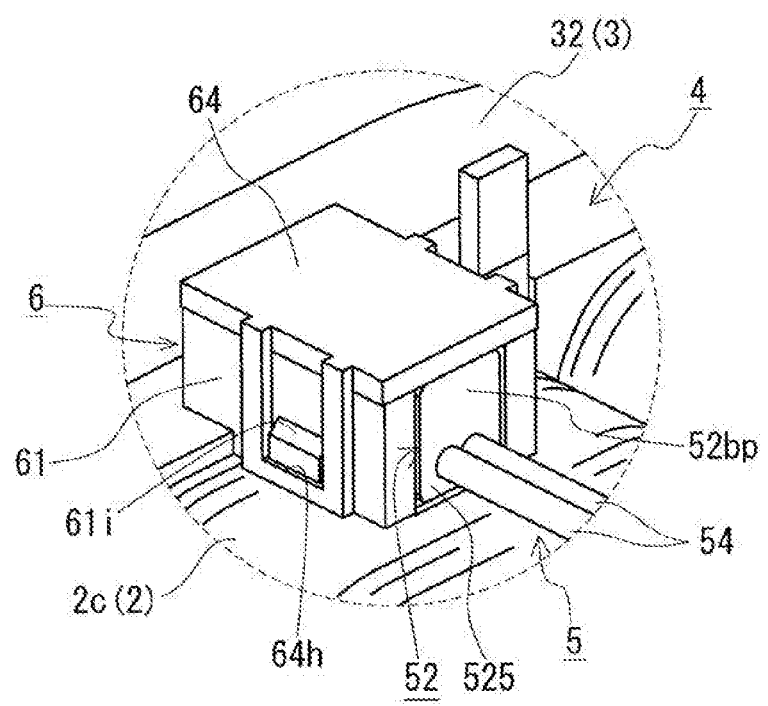

REACTOR

CROSS-REFERENCE TO RELATED APPLICATIONS

This application claims the priority of Japanese Patent Application No. JP JP2017-158928 filed Aug. 21, 2017.

TECHNICAL FIELD

The present disclosure relates to a reactor.

BACKGROUND

One of the components of a circuit that increases/decreases the voltage is a reactor. For example, JP 2015-53395A, JP 2016-82042A, and JP 2016-127760A disclose reactors each including a coil that has a wound portion formed by winding a wire, a magnetic core that has portions disposed inside and outside the wound portion, and a temperature sensor that measures the temperature of the coil or the magnetic core.

JP 2015-53395A discloses a configuration in which a temperature sensor (thermosensitive element) is attached to a wire that constitutes a coil or an accessory member that is connected to the wire, and the temperature sensor is covered by a covering piece and fixed using a shrinkable tube or a piece of pressure-sensitive adhesive tape. JP 2016-82042A discloses a configuration in which an opposing member that opposes an end surface of a wound portion of a coil is provided, a groove portion is formed on a side of the opposing member that faces the end surface of the wound portion, and a temperature sensor is disposed in the groove portion. JP 2016-127760A discloses a configuration in which a groove in which a sensor is to be disposed is formed in an outer peripheral surface of an inner core portion of a magnetic core, the inner core portion being inserted in a wound portion of a coil, and a temperature sensor is disposed in this groove.

JP 2015-53395A, JP 2016-82042A, and JP 2016-127760A are examples of related art.

For such reactors, techniques of attaching a temperature sensor to an outer peripheral surface of a wound portion of a coil and measuring the temperature of the coil have been studied. Some temperature sensors have a fixed detection surface that detects the temperature, and there is a risk that if the orientation of the detection surface of a temperature sensor relative to the wound portion of a coil changes, the measurement error will increase, and the temperature of the coil cannot be accurately measured. Therefore, there is a demand for preventing the temperature sensor from being attached to the wound portion of the coil in a wrong direction.

SUMMARY

Thus, an object of the present disclosure is to provide a reactor that can prevent a temperature sensor from being attached to a wound portion of a coil in a wrong direction.

A reactor according to the present disclosure includes a coil that has a wound portion; a magnetic core that is disposed inside and outside the wound portion; a temperature sensor for measuring a temperature of the coil, the temperature sensor having a sensor main portion that is attached to an outer peripheral surface of the wound portion and a wire that is led out from the sensor main portion; and a sensor housing portion that houses the sensor main portion of the temperature sensor, wherein the sensor main portion has a detection surface that faces the wound portion and at least one projecting portion that protrudes from a back surface of the sensor main portion on a side opposite to the detection surface. The sensor housing portion has a pair of side wall portions that oppose respective opposite side surfaces of the sensor main portion, the side surfaces intersecting the detection surface, and that are provided at a distance from each other. When in the sensor main portion, a direction in which the wire is led out is referred to as an axial direction, a direction that is orthogonal to the detection surface is referred to as a vertical direction, and a direction that is orthogonal to both the vertical direction and the axial direction is referred to as a horizontal direction, a height, in the vertical direction, of a portion of the sensor main portion that has the projecting portion is larger than a width of that portion in the horizontal direction and larger than the distance between the side wall portions.

The above-described reactor can prevent the temperature sensor from being attached to the wound portion of the coil in a wrong direction.

BRIEF DESCRIPTION OF THE DRAWINGS

FIG. 1 is a schematic perspective view showing a reactor of Embodiment 1;

FIG. 2 is a schematic partially-exploded perspective view showing the reactor of Embodiment 1;

FIG. 3 is a schematic perspective view showing the vicinity of a sensor main portion of a temperature sensor of the reactor of Embodiment 1 in an enlarged manner;

FIG. 4 is a schematic cross-sectional view showing the vicinity of the sensor main portion of the temperature sensor of the reactor of Embodiment 1 in an enlarged manner;

FIG. 5 schematically shows an external shape of the sensor main portion of the temperature sensor;

FIG. 6 is a schematic enlarged view showing the sensor main portion of the temperature sensor of the reactor of Embodiment 1 when viewed from a wire lead-out surface side;

FIG. 7 is an enlarged cross-sectional view showing the vicinity of a sensor main portion of a temperature sensor of a reactor of Embodiment 2;

FIG. 8 is an enlarged cross-sectional view showing the vicinity of a sensor main portion of a temperature sensor of a reactor of Embodiment 3;

FIG. 9 is a schematic perspective view showing a sensor housing portion of a reactor of Embodiment 4 in an enlarged manner.

DETAILED DESCRIPTION OF PREFERRED EMBODIMENTS

First, aspects of the present disclosure will be listed and described.

(1) A reactor according to an aspect of the present disclosure is a reactor including: a coil that has a wound portion; a magnetic core that is disposed inside and outside the wound portion; a temperature sensor for measuring a temperature of the coil, the temperature sensor having a sensor main portion that is attached to an outer peripheral surface of the wound portion and a wire that is led out from the sensor main portion; and a sensor housing portion that houses the sensor main portion of the temperature sensor.

The sensor main portion has a detection surface that faces the wound portion and at least one projecting portion that protrudes from a back surface of the sensor main portion on a side opposite to the detection surface. The sensor housing portion has a pair of side wall portions that oppose respective opposite side surfaces of the sensor main portion, the side surfaces intersecting the detection surface, and that are provided at a distance from each other. When in the sensor main portion, a direction in which the wire is led out is referred to as an axial direction, a direction that is orthogonal to the detection surface is referred to as a vertical direction, and a direction that is orthogonal to both the vertical direction and the axial direction is referred to as a horizontal direction. A height, in the vertical direction, of a portion of the sensor main portion that has the projecting portion is larger than a width of that portion in the horizontal direction and larger than the distance between the side wall portions.

In the above-described reactor, the sensor main portion of the temperature sensor is disposed and attached between the side wall portions of the sensor housing portion in a state in which the detection surface of the sensor main portion faces the outer peripheral surface of the wound portion of the coil. The temperature sensor included in the above-described reactor has the projecting portion on the back surface of the sensor main portion, which is located on the opposite side to the detection surface, and the height, in the vertical direction, of the portion of the sensor main portion that has the projecting portion is larger than the width of that position in the horizontal direction and larger than the distance between the side wall portions. With the above-described reactor, since the sensor main portion has the projecting portion, it is easy to distinguish between a detection surface side and a back surface side, and therefore, when disposing the sensor main portion between the side wall portions and attaching the temperature sensor therebetween, it is possible to prevent the temperature sensor from being attached in a wrong direction. Moreover, since the height, in the vertical direction, of the portion of the sensor main portion that has the projecting portion is larger than the distance between the side wall portions, in order to ensure that the detection surface faces the wound portion when disposing the sensor main portion between the side wall portions, the sensor main portion cannot be disposed between the side wall portions unless the detection surface is in a state in which it faces the wound portion. Furthermore, since the height in the vertical direction is larger than the distance between the side wall portions, even if the sensor main portion in a state in which it is disposed between the side wall portions attempts to rotate due to twisting of the wire or other reasons, the projecting portion abuts against either one of the side wall portions, thereby stopping the rotation of the sensor main portion. Therefore, the above-described reactor can, with a simple configuration, prevent the temperature sensor from being attached to the wound portion of the coil in a wrong direction, and the workability in attaching the temperature sensor is excellent. Moreover, since the temperature sensor is attached such that the detection surface of the sensor main portion faces the outer peripheral surface of the wound portion, the temperature of the coil can be accurately measured.

(2) As an embodiment of the above-described reactor, a configuration is conceivable in which the sensor housing portion has a lid portion that covers a back surface side of the sensor main portion.

Since the sensor housing portion has the side wall portions and the lid portion, not only the opposite side surface sides of the sensor main portion but also the back surface side can be covered, and the sensor main portion can be protected. Moreover, in the case of a reactor in which a liquid coolant is brought into direct contact with the coil, and the coil is forcedly cooled by the liquid coolant, exposure of the sensor main portion to the liquid coolant can be suppressed by the sensor housing portion covering the sensor main portion. Thus, the temperature of the coil can be properly and accurately measured by minimizing the effect of the liquid coolant.

(3) As an embodiment of the above-described reactor in which the sensor housing portion has the lid portion, a configuration is conceivable in which a region of the back surface of the sensor main portion excluding the projecting portion has a flat surface, and the reactor further includes a resilient member that is disposed between the flat surface and the lid portion and that presses the sensor main portion against the wound portion.

Since the resilient member is provided between the sensor main portion and the lid portion, and the sensor main portion is pressed against the wound portion by the resilient member, it is easy to bring the detection surface of the sensor main portion into close contact with the outer peripheral surface of the wound portion, and the measurement accuracy can be increased. Moreover, since the resilient member is disposed on the flat surface, which is formed on the back surface of the sensor main portion, the sensor main portion can be stably pressed against the wound portion. For example, a coil spring, a leaf spring, or the like can be used as the resilient member.

(4) As an embodiment of the above-described reactor, a configuration is conceivable in which the reactor further includes a heat dissipation member between the detection surface and the wound portion.

Since the heat dissipation member is provided between the detection surface and the wound portion, it is easy to bring the detection surface of the sensor main portion into close contact with the outer peripheral surface of the wound portion via the heat dissipation member, and the measurement accuracy can be increased. For example, a heat dissipation sheet, heat dissipation grease, or the like can be used as the heat dissipation member.

(5) As an embodiment of the above-described reactor, a configuration is conceivable in which the reactor further includes an end surface connecting member that is disposed between an outer core portion of the magnetic core, the outer core portion being disposed outside the wound portion, and an end surface of the wound portion, wherein the side wall portions of the sensor housing portion are integrally provided in the end surface connecting member.

Since the side wall portions of the sensor housing portion are integrally provided in the end surface connecting member, the side wall portions are disposed at predetermined positions relative to the wound portion as a result of the coil, the magnetic core, and the end surface connecting member being assembled together during the assembly of the reactor. Thus, the sensor main portion can be attached at a predetermined position on the outer peripheral surface of the wound portion. Moreover, since the side wall portions are integrally provided in the end surface connecting member, the number of components can be reduced, and the workability can be increased.

Hereinafter, specific examples of reactors according to embodiments of the present disclosure will be described with reference to the drawings. In the drawings, like reference numerals denote objects having like names. It should be noted that the present disclosure is not limited to the examples below, but rather is defined by the appended claims, and all changes that fall within the meaning and range of equivalency of the claims are therefore intended to be embraced therein.

Embodiment 1

Configuration of Reactor

A reactor 1 according to Embodiment 1 will be described with reference to FIGS. 1 to 6. As shown in FIGS. 1 and 2, the reactor 1 of Embodiment 1 includes a coil 2 that has wound portions 2c, a magnetic core 3 that is disposed inside and outside the wound portions 2c, and a temperature sensor 5 that measures the temperature of the coil 2. The temperature sensor 5 has a sensor main portion 52 that is attached to an outer peripheral surface of a wound portion 2c and wires 54 that are led out from the sensor main portion 52 (see also FIGS. 3 and 4). One of the features of the reactor 1 is that, as shown in FIGS. 2 and 4, the sensor main portion 52 has a detection surface 521 that faces the wound portion 2c and a projecting portion 52bp that protrudes from a back surface 522 on the opposite side to the detection surface 521 (see also FIGS. 5 and 6).

Furthermore, as shown in FIGS. 1 and 2, the reactor 1 includes outer core portions 32 of the magnetic core 3 that are disposed outside the wound portions 2c, and end surface connecting members 4 that are each disposed between an outer core portion 32 and corresponding end surfaces of the wound portions 2c.

The reactor 1 is placed on an installation target (not shown) such as a converter case, for example. Here, the lower side of the reactor 1 (coil 2 and magnetic core 3) in the paper plane of FIG. 1 is an installation side that faces the installation target. The installation side is referred to as "down", the opposite side to the installation side as "up", and the up-down direction as a vertical direction (height direction). Moreover, a direction in which the wound portions 2c are lined up is referred to as a horizontal direction (width direction). In FIG. 5, a schematic top view of the sensor main portion 52 when viewed from the back surface 522 side is shown above, and a schematic side view of the sensor main portion 52 is shown below. Hereinafter, a configuration of the reactor 1 will be described in detail.

Coil

As shown in FIGS. 1 and 2, the coil 2 has two wound portions 2c, which are formed by helically winding two respective wires, and one end portion of one of the two wound portions 2c is connected to one end portion of the other wound portion 2c via a joint portion 2r. The two wound portions 2c are arranged side-by-side (in parallel) such that their axial directions are parallel to each other. The joint portion 2r is formed by joining one end portion of one of the wires that are led out from the respective wound portions 2c to one end portion of the other wire using a joining method such as welding, soldering, or brazing. With regard to the other end portions of the two wound portions 2c, the wire end portions are led out from the respective wound portions 2c in an appropriate direction (upward in this example), attached to respective terminal fittings (not shown), and electrically connected to an external device (not shown) such as a power supply that supplies power to the coil 2. A known coil can be used as the coil 2, and, for example, the two wound portions 2c may be formed from a single continuous wire.

The two wound portions 2c are formed from wires of the same specifications, and have the same shape, size, winding direction, and number of turns. A coated rectangular wire (so-called enameled wire) having a conductor (copper or the like) constituted by a rectangular wire and an insulating coating (polyamide-imide or the like) that covers an outer periphery of the conductor can be used as the wires. In this example, the wound portions 2c are quadrangular tube-shaped (specifically, rectangular tube-shaped) edgewise coils, each of which is formed by winding a coated rectangular wire edgewise, and the contour shape of the end surface of each wound portion 2c when viewed in the axial direction is a rectangular shape with rounded corners. The specifications of the wires and the wound portions 2c can be changed as appropriate, and the two wound portions 2c may have different shapes, sizes, winding directions, or numbers of turns.

In this example, the outer peripheral surfaces of the respective wound portions 2c are not covered by a coating member such as a resin, and when the reactor 1 is configured, the outer peripheral surfaces of the wound portions 2c are exposed as shown in FIG. 1. Therefore, in the case of a reactor in which the coil 2 is forcedly cooled by a liquid coolant, the liquid coolant can be brought into direct contact with the outer peripheral surfaces of the wound portions 2c, and thus, the coil 2 can be efficiently cooled by the liquid coolant.

Magnetic Core

As shown in FIGS. 1 and 2, the magnetic core 3 includes the two outer core portions 32, which are disposed outside the wound portions 2c, and two inner core portions (not shown) that are disposed inside the respective wound portions 2c. The inner core portions are portions which are located inside the respective wound portions 2c that are arranged side-by-side, and on which the coil 2 is disposed. That is to say, the two inner core portions are arranged side-by-side (in parallel) in the same manner as the wound portions 2c. The inner core portions each have a shape corresponding to the inner peripheral surface of a corresponding one of the wound portions 2c, and in this example, the inner core portions are each formed into a quadrangular column shape (specifically, rectangular column shape). The outer core portions 32 are portions which are located outside the wound portions 2c and on which the coil 2 is not substantially disposed (that is, portions protruding (exposed) from the wound portions 2c). The outer core portions 32 are provided so as to connect end portions of the two inner core portions to each other. In this example, the outer core portions 32 are column-shaped portions whose surface (lower surface) on the installation side and upper surface on the opposite side to the installation side have a trapezoidal shape.

The magnetic core 3 shown in this example is configured as a ring-shaped core by the outer core portions 32 being arranged so as to sandwich the inner core portions from opposite ends thereof, and the end surfaces of each of the two inner core portions opposing and being connected to the corresponding inner end surfaces of the outer core portions 32. When the coil 2 is energized and excited, a magnetic flux flows through the magnetic core 3, and a closed magnetic circuit is formed.

The magnetic core 3 (inner core portions and outer core portions 32) is made of a material containing a soft magnetic material. Examples of the soft magnetic material include soft magnetic metals, such as iron and iron alloys (Fe—Si alloy, Fe—Si—Al alloy, Fe—Ni alloy, and the like). For example, the magnetic core 3 may be constituted by a powder compact that is obtained by compression molding soft magnetic powder composed of a soft magnetic material, coated soft magnetic powder having an insulating coating, or the like; a molded body that is obtained by molding a composite material containing soft magnetic powder and a resin; or the like. The resin content in the composite material may be, for example, between 10 vol % and 70 vol % inclusive, and particularly between 20 vol % and 50 vol % inclusive. The specifications of the magnetic core 3 can be changed as appropriate.

In this example, as shown in FIG. 1, the reactor 1 includes resin-molded portions 9 that cover outer peripheral surfaces of the respective outer core portions 32 along the external shapes of the outer core portions 32. The resin-molded portions 9 have attachment portions 92 for fixing the reactor 1 to an installation target. The attachment portions 92 are provided at respective positions corresponding to opposite side surfaces of each outer core portion 32, and thus, a total of four attachment portions 92 are provided. A collar 94 made of metal is embedded in each of the attachment portions 92, and the reactor 1 can be fixed to the installation target by inserting fastening members (not shown), such as bolts, into the through holes of the respective collars 94.

For example, the resin-molded portions 9 are made of a thermoplastic resin such as a polyphenylene sulfide (PPS) resin, a polytetrafluoroethylene (PTFE) resin, a liquid crystal polymer (LCP), a polyamide (PA) resin such as nylon 6 or nylon 66, a polybutylene terephthalate (PBT) resin, or an acrylonitrile butadiene styrene (ABS) resin. In addition, the resin-molded portions 9 can also be made of a thermosetting resin such as an unsaturated polyester resin, an epoxy resin, a urethane resin, or a silicone resin.

End Surface Connecting Members

The end surface connecting members 4 are members for ensuring electrical insulation between the coil 2 (wound portions 2c) and the outer core portions 32, and, as shown in FIG. 2, are each disposed between an outer core portion 32 and the corresponding end surfaces of the wound portions 2c and separately disposed at opposite ends of the coil 2 (wound portions 2c). A first end surface connecting member 4, which is one of the two end surface connecting members 4, is provided with a sensor housing portion 6 (side wall portions 61). A second end surface connecting member 4, which is the other end surface connecting member 4, has the same configuration as the first end surface connecting member 4 except that the sensor housing portion 6 is not provided.

The end surface connecting members 4 each have, on a wound portion 2c side, groove-like coil housing portions 42 in which end portions of the respective wound portions 2c are housed, and tube-shaped, inner core insertion portions 44 into which end portions of the respective inner core portions are inserted. Each of the coil housing portions 42 is formed along the end surface and a wire lead-out end portion, of a corresponding one of the wound portions 2c. Each of the inner core insertion portions 44 is formed into a shape that corresponds to an outer peripheral surface of a corresponding one of the inner core portions, and specifically, a quadrangular shape (rectangular shape) with rounded corners that corresponds to the contour shape of the end surface of that inner core portion. Moreover, the end surface connecting members 4 each have, on an outer core portion 32 side, a recessed, outer core fitting portion 46 to which an inner end surface side of a corresponding one of the outer core portions 32 is fitted. Each outer core fitting portion 46 has a shape that follows a peripheral edge of the inner end surface of a corresponding one of the outer core portions 32, and specifically, a quadrangular shape (rectangular shape) that corresponds to the contour shape of the inner end surface of that outer core portion 32.

When the end surface connecting members 4 are assembled to both ends of the coil 2 in which the inner core portions have been inserted in the respective wound portions 2c, the end portions of the wound portions 2c are housed in the respective coil housing portions 42, and the end portions of the inner core portions are inserted in the respective inner core insertion portions 44. Thus, the inner core portions are positioned relative to the end surface connecting members 4, and the inner core portions are positioned in the respective wound portions 2c. Furthermore, when the outer core portions 32 are assembled to the respective end surface connecting members 4, the inner end surface side of each outer core portion 32 is fitted to a corresponding one of the outer core fitting portions 46, the outer core portions are positioned relative to the end surface connecting members 4, and consequently, the inner core portions and the outer core portions 32 are positioned relative to one another via the end surface connecting members 4. Moreover, as a result of the coil 2 (wound portions 2c) and the first end surface connecting member 4 being assembled together, the sensor housing portion 6 (side wall portions 61) is placed at a predetermined position relative to the wound portions 2c. A configuration of the sensor housing portion 6 will be described later.

The end surface connecting members 4 are made of a resin having electrical insulating properties, and, for example, may be made of a thermoplastic resin, such as a PPS resin, a PTFE resin, an LCP, a PA resin, a PBT resin, or an ABS resin, or a thermosetting resin, such as an unsaturated polyester resin, an epoxy resin, a urethane resin, or a silicone resin.

Temperature Sensor

As shown in FIGS. 2 to 4, the temperature sensor 5 has the sensor main portion 52 that has a bar-like shape and that is attached to the outer peripheral surface of a wound portion 2c of the coil 2, and the wires 54 that are led out from the sensor main portion 52. The sensor main portion 52 is constituted by a sensor element 52a and a protective portion 52b that covers the outer periphery of the sensor element 52a (see FIG. 4). The wires 54 extend from the sensor element 52a and transmit electric signals based on temperature information detected by the sensor element 52a to an external device (not shown), such as a control device. In this example, the sensor main portion 52 is attached to an upper surface of the wound portion 2c, and the sensor main portion 52 is disposed such that the axial direction of the sensor main portion 52 matches the axial direction of the wound portion 2c. Here, the direction in which the wires 54 are led out (left-right direction in the paper plane of FIG. 4) is regarded as the axial direction of the sensor main portion 52. The attachment position of the sensor main portion 52 can be changed as appropriate, and the sensor main portion 52 can also be attached to a side surface, instead of the upper surface, of the outer peripheral surface of the wound portion 2c.

The sensor element 52a shown in FIG. 4 is an element capable of detecting the temperature of the coil 2 (wound portion 2c), and may be a thermosensitive element, such as a thermistor, a thermocouple, or a pyroelectric element, for example. In this example, the sensor element 52a is a thermistor.

The protective portion 52b shown in FIG. 4 covers the sensor element 52a and defines the external shape of the sensor main portion 52. For example, the protective portion 52b is made of a thermoplastic resin, such as a PPS resin, a PTFE resin, an LCP, a PA resin, a PBT resin, or an ABS resin, or a thermosetting resin, such as an unsaturated polyester resin, an epoxy resin, a urethane resin, or a silicone resin. Since these resins have electrical insulating properties, the electrical insulation between the coil 2 (wound portion 2c) and the sensor element 52a can be ensured by the protective portion 52b. To form the protective portion 52b, for example, insert molding can be used, in which the sensor element 52a is set within a mold, a resin is poured into the mold, and the resin is thereby integrally molded with the outer periphery of the sensor element 52a. Thus, the sensor element 52a and the protective portion 52b can be integrated, and the sensor element 52a can be embedded in the protective portion 52b.

Sensor Main Portion

As shown in FIGS. 2 and 5, the sensor main portion 52 (protective portion 52b) has the detection surface 521, the temperature of which is detected by the sensor element 52a (see FIG. 4), the back surface 522, which is located on the opposite side to the detection surface 521, left and right side surfaces 523 that intersect the detection surface 521 and extend along the axial direction, a wire lead-out surface 525 that intersects the detection surface 521 and from which the wires 54 are led out, and an end surface 526 that is located on the opposite side to the wire lead-out surface 525. More specifically, that the left and right side surfaces 523 intersect the detection surface 521 may mean that left and right side surfaces 523 are arranged at an angle, for example a right angle, with respect to the detection surface 521. In this example, the detection surface 521 is oriented facing downward so that the detection surface 521 faces the upper surface of the wound portion 2c, and the sensor main portion 52 is disposed in the state in which the detection surface 521 faces the upper surface of the wound portion 2c (see also FIG. 6). Here, in the sensor main portion 52, a direction that is orthogonal to the detection surface 521 is referred to as the vertical direction, and a direction that is orthogonal to both the vertical direction and the axial direction (i.e., direction from one of the side surfaces 523 toward the other side surface 523) is referred to as the horizontal direction.

In the present embodiment, as shown in FIG. 5, the sensor main portion 52 (protective portion 52b) has the projecting portion 52bp, which protrudes from the back surface 522 on the opposite side to the detection surface 521. In this example, the projecting portion 52bp is integrally molded with the protective portion 52b. Here, when a portion of the sensor main portion 52 excluding the projecting portion 52bp is referred to as a base portion 520, the base portion 520, in this example, is quadrangular bar-shaped (specifically, rectangular bar-shaped), and the contour shape of the base portion 520 when viewed in the axial direction is a rectangular shape with rounded corners (see FIG. 6). Thus, the above-described various surfaces (detection surface 521, back surface 522, two side surfaces 523, wire lead-out surface 525, and end surface 526) of the base portion 520 are substantially formed by planar surfaces. Accordingly, the detection surface 521, which faces the wound portion 2c, of the sensor main portion 52 is a planar surface, and it is easy to bring the detection surface 521 into close contact with the outer peripheral surface of the wound portion 2c (see FIGS. 4 and 6). Moreover, although the two side surfaces 523 of the sensor main portion 52, in this example, are planar surfaces that are orthogonal to the detection surface 521, the side surfaces 523 may also be curved surfaces, or may be inclined surfaces that are inclined relative to the detection surface 521. Preferably, the sensor main portion 52 is formed such that the detection surface 521 contains a planar surface. The contour shape (cross-sectional shape taken in a direction that is orthogonal to axial direction) of the base portion 520 may be, in addition to a rectangular shape, for example, a polygonal shape, such as a trapezoidal shape, an oval shape (racetrack shape), a hexagonal shape, or an octagonal shape, or the like.

Projecting Portion

The projecting portion 52bp is provided protruding from the back surface 522 of the sensor main portion 52, and, in this example, protrudes upward from the back surface 522 (see FIGS. 2 and 4). The projecting portion 52bp shown in this example is located on one end side (wire lead-out surface 525 side) of the sensor main portion 52 in the axial direction, and the sensor main portion 52 is L-shaped when the sensor main portion 52 is viewed from a side surface 523 side (see the diagram on the lower side in FIG. 5). In this example, a surface of the projecting portion 52bp on the wire lead-out surface 525 side is formed above and contiguously to the wire lead-out surface 525, and is flush with the wire lead-out surface 525. Moreover, surfaces of the projecting portion 52bp on respective side surface 523 sides are formed above and contiguously with the respective side surfaces 523, and are flush with the respective side surfaces 523. The position at which the projecting portion 52bp is formed can be changed as appropriate, and may also be on the other end side (end surface 526 side) of the sensor main portion 52 in the axial direction or may be an intermediate position in the axial direction. Moreover, the number of projecting portions 52bp is not limited to one, and it is also possible to provide a plurality of projecting portions 52bp along the axial direction of the sensor main portion 52.

In the present embodiment, as shown in FIG. 6, when the contour shape of the sensor main portion 52 is viewed in the axial direction (from wire lead-out surface 525 side in FIG. 6), the height (H), in the vertical direction, of a portion of the sensor main portion 52, the portion having the projecting portion 52bp, is larger than the width (W) of that portion in the horizontal direction (W<H). That is to say, the portion of the sensor main portion 52 that has the projecting portion 52bp is vertically long. In this example, the height, in the vertical direction, of a portion that does not have the projecting portion 52bp (i.e., a portion of the base portion 520) is smaller than the width of that portion in the horizontal direction, and so this portion is horizontally long.

Sensor Housing Portion

As shown in FIGS. 1 to 4, the sensor housing portion 6 is a portion that houses the sensor main portion 52 of the temperature sensor 5, and is provided at the position (in this example, upper surface of wound portion 2c) to which the sensor main portion 52 is attached. As shown in FIGS. 2 and 3, the sensor housing portion 6 has a pair of side wall portions 61 that are spaced apart from each other, and the two side wall portions 61 are arranged so as to oppose the two respective side surfaces 523 of the sensor main portion 52 (see FIG. 6).

In this example, the side wall portions 61 of the sensor housing portion 6 are integrally molded with the end surface connecting member 4 and are therefore made of the same resin as the end surface connecting member 4. The side wall portions 61 are provided extending from an upper surface of the end surface connecting member 4 toward the wound portion 2c, and are disposed on the upper surface of the wound portion 2c. The side wall portions 61 extend along the respective side surfaces 523 of the sensor main portion 52, and each have such a size that the side wall portion 61 can cover the entire side surface 523. Moreover, in this example, an end wall portion 62 that closes a space between the side wall portions 61 is integrally formed with an outer core portion 32 side of the side wall portions 61, and the end wall portion 62 is disposed so as to oppose the end surface 526 of the sensor main portion 52. Thus, not only the opposite side surface 523 sides of the sensor main portion 52 but also the end surface 526 side of the sensor main portion 52 can be covered.

On the other hand, one end side of the side wall portions 61 that is opposite to the side on which the end wall portion 62 is formed constitutes a wire lead-out side from which the wires 54 are led out. On this end side, the space between the side wall portions 61 is open, and the wire lead-out surface 525 of the sensor main portion 52 is disposed. When the coil 2 and the end surface connecting member 4 are assembled together, the side wall portions 61 and the end wall portion 62 as well as the outer peripheral surface (upper surface here) of the wound portion 2c together form a housing space in which the sensor main portion 52 is disposed. The sensor main portion 52 is inserted and disposed between the side wall portions 61 in a state in which the detection surface 521 faces the upper surface of the wound portion 2c. When the sensor main portion 52 is disposed between the side wall portions 61, the wires 54 are led out from the one end side (wire lead-out side) of the side wall portions 61 toward the inner side of the wound portion 2c in the axial direction (see FIG. 1). Although the side wall portions 61, in this example, are integrally provided with the end surface connecting member 4, the side wall portions 61 may also be prepared separately from the end surface connecting member 4 and attached to the end surface connecting member 4.

As shown in FIG. 6, the distance (D) between the side wall portions 61 is larger than the width (W) of the sensor main portion 52 in the horizontal direction, and when the sensor main portion 52 is disposed between the side wall portions 61, a predetermined clearance is formed between each of the side wall portions 61 and a corresponding one of the side surfaces 523. In this example, the distance (D) between the side wall portions 61 is set to be larger than the diagonal length (L) of the contour shape of the base portion 520. Thus, a sufficient clearance is ensured between each of the side wall portions 61 and a corresponding one of the side surfaces 523 of the sensor main portion 52, and it is easy to insert the sensor main portion 52 between the side wall portions 61.

Furthermore, in the present embodiment, the height (H) in the vertical direction, of the portion of the sensor main portion 52 that has the projecting portion 52bp is larger than the distance (D) between the side wall portions 61 (D<H). That is to say, the height (H) in the vertical direction is larger than the width (W) in the horizontal direction and larger than the distance (D) between the side wall portions 61 (W<D<H). Therefore, for example, in order to ensure that the detection surface 521 faces the wound portion 2c when inserting the sensor main portion 52 from above the side wall portions 61 and disposing the sensor main portion 52 between the side wall portions 61, the sensor main portion 52 cannot be disposed between the side wall portions 61 unless the detection surface 521 is in a state in which it faces the wound portion 2c. In FIG. 6, the sensor main portion 52 in a state in which the detection surface 521 is oriented in the horizontal direction is shown with long dashed double-short dashed lines, and in the shown state, the sensor main portion 52 cannot be inserted between the side wall portions 61. Moreover, since the height (H) in the vertical direction is larger than the distance (D) between the side wall portions 61, in a state in which the sensor main portion 52 is disposed between the side wall portions 61, even if the sensor main portion 52 attempts to rotate due to twisting of the wires 54 or other reasons, the projecting portion 52bp abuts against either one of the side wall portions 61, thereby stopping the rotation of the sensor main portion 52. In this example, as shown in FIG. 4, the height of the projecting portion 52bp is set such that a top surface of the projecting portion 52bp that is located on a side (back surface 522 side) opposite to the detection surface 521 comes into contact with an inner surface of a lid portion 64, which will be described later.

As shown in FIGS. 2 to 4, the sensor housing portion 6 shown in this example has the lid portion 64 that covers the back surface 522 side of the sensor main portion 52. The lid portion 64 is provided separately from the side wall portions 61, and, for example, is made of the same resin as the side wall portions 61 (end surface connecting member 4). The lid portion 64 has such a size that the lid portion 64 can cover the entire back surface 522 including the projecting portion 52bp, of the sensor main portion 52. Due to the sensor housing portion 6 having the lid portion 64, the back surface 522 side can also be covered, and the sensor main portion 52 can be protected. For example, if the coil 2 is forcedly cooled by bringing a liquid coolant into direct contact with the wound portions 2c, exposure of the sensor main portion 52 to the liquid coolant can be suppressed by the sensor housing portion 6 covering the sensor main portion 52. Therefore, the temperature of the coil 2 (wound portions 2c) can be properly and accurately measured by minimizing the effect of the liquid coolant.

In this example, the lid portion 64 is attached to the side wall portions 61 by joining the side wall portions 61 and the lid portion 64 together using a snap-fit structure (see FIG. 4). After the sensor main portion 52 is disposed in the housing space formed by the side wall portions 61, the end wall portion 62, and the upper surface of the wound portion 2c, the lid portion 64 is attached to an upper side of the side wall portions 61 and disposed so as to oppose the back surface 522 of the sensor main portion 52.

The snap-fit structure illustrated in FIG. 4 includes an engagement groove 62s that is formed in an inner surface of the end wall portion 62, and an engagement claw 64s that is formed on the lid portion 64 and is engageable with the engagement groove 62s. A guide groove 62g is formed in the inner surface of the end wall portion 62, the guide groove 62g extending from the upper side of the end wall portion 62, to which the lid portion 64 is attached, to the engagement groove 62s. The guide groove 62g is a groove for guiding the engagement claw 64s to the engagement groove 62s and is shallower than the engagement groove 62s. An extension portion 64e is provided on an end wall portion 62 side of the lid portion 64, the extension portion 64e extending toward the wound portion 2c (downward), and the engagement claw 64s is formed at a leading end portion of the extension portion 64e so as to protrude toward the end wall portion 62. The engagement claw 64s has a tapered shape that tapers from the leading end portion of the extension portion 64e in the protruding direction.

Furthermore, in this example, as shown in FIG. 3, protruding portions 61p are provided at end portions of the respective side wall portions 61 on the side (wire lead-out side) opposite to the side on which the end wall portion 62 is formed, the protruding portions 61p protruding toward the lid portion 64 (upward). The protruding portions 61p protrude approximately the same amount as the thickness of the lid portion 64. When the side wall portions 61 are viewed from a side surface side (horizontal direction), each protruding portion 61p is formed in a rectangular trapezoidal shape, where the upper side of the protruding portion 61p corresponds to the long base, the lower side corresponds to the short base, and a side that is nearer to the end wall portion 62 corresponds to the oblique side. Moreover, the lid portion 64 has notches 64c to be fitted to the respective protruding portions 61p, the notches 64c being formed at positions corresponding to the respective protruding portions 61p (see also FIG. 2). A surface of each notch 64c that opposes the above-described oblique side of a corresponding one of the protruding portions 61p constitutes an inclined surface. When the lid portion 64 is attached to the side wall portions 61, the notches 64c of the lid portion 64 are engaged with the respective protruding portions 61p of the side wall portions 61, and the inclined surfaces of the notches 64c come into contact with the oblique sides of the protruding portions 61p, so that the wire lead-out side of the lid portion 64 is fixed while being prevented from disengaging upward.

Moreover, in this example, as shown in FIG. 4, resilient members 7 (coil springs 72), which will be described later, are provided between the sensor main portion 52 and the lid portion 64, and column-shaped support portions 64f are provided on the inner surface of the lid portion 64, the support portions 64f protruding toward the back surface 522 of the sensor main portion 52 to support the respective resilient members 7. The coil springs 72 are, for example, axially supported on the support portions 64f, and thus, displacement of the coil springs 72 can be suppressed.

Resilient Members

As shown in FIG. 4, the resilient members 7 are disposed between the sensor main portion 52 and the lid portion 64 in a compressed state, and bias the sensor main portion 52 to press the sensor main portion 52 against the wound portion 2c. Thus, it is easy to bring the detection surface 521 of the sensor main portion 52 into close contact with the outer peripheral surface of the wound portion 2c, so that the measurement accuracy can be increased. Although the coil springs 72 are used as the resilient members 7 in this example, leaf springs or a resilient material, such as rubber, may be used instead of the coil springs 72. Moreover, in this example, the two coil springs 72 are lined up in the axial direction of the sensor main portion 52. The use of a plurality of coil springs 72 as in this example makes it more likely that the pressing force acts uniformly across the entire length of the sensor main portion 52 in the axial direction. A configuration may also be adopted in which a single coil spring 72 is provided, and in this case, the coil spring 72 is preferably disposed at an intermediate position of the sensor main portion 52 in the axial direction.

According to the present embodiment, as described above, the back surface 522 of the sensor main portion 52 (base portion 520) is formed by a planar surface (see FIG. 5), and apart from the projecting portion 52bp, a region of the back surface 522 of the sensor main portion 52 has a flat surface. Moreover, as shown in FIG. 4, the resilient members 7 (coil springs 72) are arranged such that the resilient members 7 are disposed between the lid portion 64 and the flat surface that is formed on the back surface 522 of the sensor main portion 52. As a result of the resilient members 7 being arranged on the flat surface of the back surface 522 of the sensor main portion 52, the sensor main portion 52 can be stably pressed against the wound portion 2c.

Heat Dissipation Member

Furthermore, as shown in FIG. 4, a heat dissipation member 8 may also be provided between the detection surface 521 of the sensor main portion 52 and the wound portion 2c. For example, a heat dissipation sheet, heat dissipation grease, or the like can be used as the heat dissipation member 8. A gap that is formed between the detection surface 521 and the wound portion 2c can be filled with the heat dissipation member 8. Thus, it is easy to bring the detection surface 521 of the sensor main portion 52 into close contact with the outer peripheral surface of the wound portion 2c via the heat dissipation member 8, so that the measurement accuracy can be increased. A commercially available product can be used as the heat dissipation member 8 as appropriate. An example of the heat dissipation sheet is a silicone gel sheet, and an example of the heat dissipation grease is silicone grease. If the heat dissipation member 8 has a pressure-sensitive adhesive layer on a detection surface 521-side surface or a wound portion 2c-side surface, of the heat dissipation member 8, the heat dissipation member 8 can be securely fixed to the detection surface 521 or the outer peripheral surface of the wound portion 2c in a close contact state.

Method for Manufacturing Reactor

An example of a method for manufacturing the reactor 1 of Embodiment 1 will be described. The reactor 1 can be manufactured by following a procedure including, for example, an assembled body assembling step of assembling the coil 2, the magnetic core 3, and the end surface connecting members 4 into an assembled body and a subsequent, sensor attaching step of attaching the temperature sensor 5 to the coil 2.

Assembled Body Assembling Step

In the assembled body assembling step, the coil 2, the magnetic core 3, and the end surface connecting members 4 are assembled together (see mainly FIG. 2).

The end surface connecting members 4 are disposed at opposite ends of the coil 2 in which the inner core portions have been inserted into the respective wound portions 2c. After that, the outer core portions 32 are disposed so as to sandwich the inner core portions from opposite ends, and assembled to the respective end surface connecting members 4. At this time, the end portions of the wound portions 2c are housed in the respective coil housing portions 42 of the end surface connecting members 4, the end portions of the inner core portions are inserted into the respective inner core insertion portions 44, and the end portions of the outer core portions 32 are fitted to the respective outer core fitting portions 46. As a result, the ring-shaped magnetic core 3 is configured by the inner core portions and the outer core portions 32, and thus, an assembled body of the coil 2, the magnetic core 3, and the end surface connecting members 4 is produced. At this time, the side wall portions 61 of the sensor housing portion 6 integrally provided in an end surface connecting member 4 are disposed on the upper surface of a wound portion 2c, and the housing space for the sensor main portion 52 is formed by the side wall portions 61 and the end wall portion 62 as well as the upper surface of the wound portion 2c.

Sensor Attaching Step

In the sensor attaching step, the sensor main portion 52 of the temperature sensor 5 is disposed between the side wall portions 61 of the sensor housing portion 6, and the sensor main portion 52 is attached to the wound portion 2c of the coil 2 (see mainly FIG. 4).

The sensor main portion 52 is attached to the upper surface of the wound portion 2c by inserting and disposing the sensor main portion 52 between the side wall portions 61 from above with the detection surface 521 facing downward so that the detection surface 521 of the sensor main portion 52 faces the upper surface of the wound portion 2c. At this time, the heat dissipation member 8 is disposed between the detection surface 521 and the wound portion 2c by, for example, disposing the heat dissipation member 8 on the upper surface of the wound portion 2c in advance before disposing the sensor main portion 52 thereon.

After the sensor main portion 52 is disposed between the side wall portions 61, the lid portion 64 is attached to the upper side of the side wall portions 61. At this time, the resilient members 7 (coil springs 72) are axially supported on the support portions 64f in advance, the support portions 64f being provided on the inner surface of the lid portion 64, and the resilient members 7 are disposed between the back surface 522 of the sensor main portion 52 and the lid portion 64. The lid portion 64 is attached to the side wall portions 61 using the snap-fit structure. Specifically, the notches 64c of the lid portion 64 are engaged with the respective protruding portions 61p of the side wall portions 61, and then, the lid portion 64 in this state is pushed from above until the engagement claw 64s of the lid portion 64 becomes engaged with the engagement groove 62s. As a result, the two side surfaces 523, the end surface 526, and the back surface 522, of the outer peripheral surface of the sensor main portion 52, are covered. Moreover, the sensor main portion 52 is pressed against the wound portion 2c by the resilient members 7, which are disposed between the sensor main portion 52 and the lid portion 64.

Effects

The reactor 1 of Embodiment 1 has the following effects.

The sensor main portion 52 of the temperature sensor 5 has the projecting portion 52bp on the back surface 522 that is located on the opposite side to the detection surface 521, and the height (H), in the vertical direction, of the portion of the sensor main portion 52 that has the projecting portion 52bp is larger than the width (W) of that portion in the horizontal direction and larger than the distance (D) between the side wall portions 61. Due to the sensor main portion 52 having the projecting portion 52bp, a detection surface 521 side can be easily identified, and thus, when disposing the sensor main portion 52 between the side wall portions 61 and attaching the sensor main portion 52 to the outer peripheral surface of the wound portion 2c, it is possible to prevent the sensor main portion 52 from being attached in a wrong direction. Moreover, since the height (H), in the vertical direction, of the portion of the sensor main portion 52 that has the projecting portion 52bp is larger than the distance (D) between the side wall portions 61, the sensor main portion 52 cannot be disposed between the side wall portions 61 unless the detection surface 521 is in a state in which it faces the wound portion 2c when disposing the sensor main portion 52 between the side wall portions 61. Furthermore, since the height (H) in the vertical direction is larger than the distance (D) between the side wall portions 61, even if the sensor main portion 52 in a state in which it is disposed between the side wall portions 61 attempts to rotate due to twisting of the wires 54 or other reasons, the projecting portion 52bp abuts against either one of the side wall portions 61, thereby stopping the rotation of the sensor main portion 52. Therefore, the reactor 1 can prevent the temperature sensor 5 (sensor main portion 52) from being attached to the wound portion 2c of the coil 2 in a wrong direction, and the workability in attaching the temperature sensor 5 is excellent. Moreover, since the temperature sensor 5 is attached such that the detection surface 521 of the sensor main portion 52 faces the outer peripheral surface of the wound portion 2c, the temperature of the coil 2 (wound portions 2c) can be accurately measured.

Since the side wall portions 61 of the sensor housing portion 6 are integrally provided in an end surface connecting member 4, the side wall portions 61 are disposed at predetermined positions relative to the wound portion 2c by the coil 2, the magnetic core 3, and the end surface connecting members 4 being assembled together during the assembly of the reactor 1. Thus, the sensor main portion 52 can be attached to a predetermined position on the outer peripheral surface of the wound portion 2c. Moreover, since the side wall portions 61 are integrally provided in the end surface connecting member 4, the number of components can be reduced, and the workability can be improved.

Uses

The reactor 1 of Embodiment 1 can be preferably used for constituent components of various converters, such as in-vehicle converters (typically, DC-DC converters) installed in vehicles such as hybrid automobiles, plug-in hybrid automobiles, electric automobiles, and fuel-cell electric automobiles and converters for air conditioners, as well as power conversion devices.

Embodiment 2

In Embodiment 2, a reactor having a configuration in which the sensor housing portion 6 has a detachment preventing portion 64p will be described with reference to FIG. 7. The basic configuration of the reactor of Embodiment 2 is the same as that of Embodiment 1, which has been described with reference to FIGS. 1 to 6, and Embodiment 2 differs from Embodiment 1 mainly in that the lid portion 64 of the sensor housing portion 6 is provided with the detachment preventing portion 64p. For this reason, the following description is focused on a configuration of the sensor housing portion 6 (lid portion 64) of Embodiment 2, and constituent elements that are the same as those of Embodiment 1 are denoted by the same reference numerals, and their description is omitted.

The lid portion 64 of Embodiment 2 has the detachment preventing portion 64p on the wire lead-out side (opposite side to the end wall portion 62 side), the detachment preventing portion 64p extending toward the wound portion 2c (downward) so as to cover the wire lead-out surface 525 side-surface of the projecting portion 52bp of the sensor main portion 52. Thus, even if the wires 54 are pulled, and the sensor main portion 52 moves in the lead-out direction of the wires 54, the projecting portion 52bp is stopped by abutting against the detachment preventing portion 64p, so that the sensor main portion 52 can be prevented from detaching from the wire lead-out side of the side wall portions 61.

Embodiment 3

In Embodiment 3, a reactor having a configuration in which the sensor main portion 52 has leg portions 52bq on the detection surface 521 side will be described with reference to FIG. 8. The basic configuration of the reactor of Embodiment 3 is the same as that of Embodiment 1, which has been described with reference to FIGS. 1 to 6, and Embodiment 3 differs from Embodiment 1 mainly in that the leg portions 52bq protruding from the detection surface 521 are formed in the sensor main portion 52 (protective portion 52b). For this reason, the following description is focused on a configuration of the sensor main portion 52 of Embodiment 3, and constituent elements that are the same as those of Embodiment 1 are denoted by the same reference numerals, and their description is omitted.

The sensor main portion 52 (protective portion 52b) of Embodiment 3 has the leg portions 52bq protruding from the detection surface 521, on one end side (wire lead-out surface 525 side) and the other end side (end surface 526 side) of the sensor main portion 52 in the axial direction. Due to the leg portions 52bq, a space is formed between the sensor main portion 52 (detection surface 521) and the wound portion 2c. The heat dissipation member 8 may be disposed in this space, or it is also possible to leave this space as an empty space (not shown) without disposing the heat dissipation member 8 therein. In the case of a reactor in which the coil 2 is forcedly cooled by a liquid coolant, this space may be filled with the liquid coolant. In this case, the protruding amount of the leg portions 52bq is set so that a space having such a size that allows the liquid coolant to enter and fill the space is formed between the detection surface 521 and the wound portion 2c. Due to the space formed between the detection surface 521 of the sensor main portion 52 and the wound portion 2c, the liquid coolant enters the space during operation of the reactor. The liquid coolant that has entered the space is kept in a state in which the space is filled with the liquid coolant, and loses the heat absorption effect after a lapse of time. Thus, a gap that is formed between the sensor main portion 52 and the wound portion 2c can be filled with the liquid coolant, with which the space is filled, and the liquid coolant functions as a heat transfer member, so that the temperature of the coil 2 (wound portions 2c) can be accurately measured. It is preferable that a region of the detection surface 521 excluding the leg portions 52bq is a planar surface.

Embodiment 4

In Embodiment 4, another configuration example of the snap-fit structure that joins the side wall portions 61 and the lid portion 64 of the sensor housing portion 6 together will be described with reference to FIG. 9. The basic configuration of the reactor of Embodiment 4 is the same as that of Embodiment 1, and Embodiment 4 differs from Embodiment 1 mainly in that the snap-fit structure is provided outside the sensor housing portion 6. For this reason, the following description is focused on a configuration of the snap-fit structure of Embodiment 4, and constituent elements that are the same as those of Embodiment 1 are denoted by the same reference numerals, and their description is omitted.

The snap-fit structure of Embodiment 4 includes engagement projections 61i that are formed on outer surfaces of the side wall portions 61, and engagement openings 64h that are formed in the lid portion 64 and are engageable with the respective engagement projections 61i. Each engagement projection 61i protrudes from the outer surface of a corresponding one of the side wall portions 61 and is formed in a projecting shape with the protruding amount decreasing from a wound portion 2c side (lower side) toward a lid portion 64 side (upper side). Each engagement opening 64h is configured by a U-shaped member that extends from the lid portion 64 toward the wound portion 2c. The lid portion 64 is attached to the side wall portions 61 by pushing the lid portion 64 from above until the engagement openings 64h of the lid portion 64 become engaged with the respective engagement projections 61i of the side wall portions 61. In this example, one pair of engagement projections 61i is provided on the outer surfaces of the two side wall portions 61, and one pair of engagement openings 64h is provided on opposite sides of the lid portion 64; however, a plurality of pairs of engagement projections 61i and a plurality of pairs of engagement openings 64h can also be provided. Moreover, in the snap-fit structure illustrated in FIG. 9, the protruding portions 61p of the side wall portions 61 and the notches 64c of the lid portion 64 (see FIGS. 2 and 3), which have been described in Embodiment 1, are not formed.

What is claimed is:

1. A reactor comprising:
   a coil that has a wound portion;
   a magnetic core that is disposed inside and outside the wound portion;
   a temperature sensor for measuring a temperature of the coil, the temperature sensor having a sensor main portion that is attached to an outer peripheral surface of the wound portion and a wire that is led out from the sensor main portion; and
   a sensor housing portion that houses the sensor main portion of the temperature sensor,
   wherein the sensor main portion has a detection surface that faces the wound portion and at least one projecting portion that protrudes from a back surface of the sensor main portion on a side opposite to the detection surface,
   the sensor housing portion has a pair of side wall portions and an open top, the pair of side wall portions oppose respective opposite side surfaces of the sensor main portion and are dimensioned to completely cover each of a pair of sides of the sensor main portion, the side surfaces of the pair of side wall portions intersecting the detection surface, and that are provided at a distance from each other, and
   when, in the sensor main portion, a direction in which the wire is led out is referred to as an axial direction, a direction that is orthogonal to the detection surface is referred to as a vertical direction, and a direction that is orthogonal to both the vertical direction and the axial direction is referred to as a horizontal direction,
   a height, in the vertical direction, of a portion of the sensor main portion that has the projecting portion is larger than a width of that portion in the horizontal direction and larger than the distance between the side wall portions; and
   an end surface connecting member that is disposed between an outer core portion of the magnetic core, and an end surface of the wound portion, the end surface connecting member having an outer wall, a coil housing portion and an inner core insertion portion, the outer wall bounds the coil housing portion so as to house an end portion of the wound portions, the coil housing portion bounding the inner core insertion portion, the inner core portion dimensioned to receive an end portion of the magnetic core, the sensor housing portion attached to the outer wall of the end surface connecting member.

2. The reactor according to claim 1, wherein the sensor housing portion has a lid portion that covers the open top and a back surface side of the sensor main portion.

3. The reactor according to claim 2,
   wherein a region of the back surface of the sensor main portion excluding the projecting portion has a flat surface, and
   the reactor further comprising:
   a resilient member that is disposed between the flat surface and the lid portion and that presses the sensor main portion against the wound portion.

4. The reactor according to claim 1, further comprising:
   a heat dissipation member between the detection surface and the wound portion.

5. The reactor according to claim 1, wherein the side wall portions of the sensor housing portion are integrally formed to the end surface connecting member.

6. The reactor according to claim 2, further comprising:
   a heat dissipation member between the detection surface and the wound portion.

7. The reactor according to claim 3, further comprising:
a heat dissipation member between the detection surface and the wound portion.

8. The reactor according to claim 2, wherein the side wall portions of the sensor housing portion are integrally formed to the end surface connecting member.

9. The reactor according to claim 3, further comprising:
an end surface connecting member that is disposed between an outer core portion of the magnetic core, the outer core portion being disposed outside the wound portion, and an end surface of the wound portion,
wherein the side wall portions of the sensor housing portion are integrally provided in the end surface connecting member.

10. The reactor according to claim 4, further comprising:
an end surface connecting member that is disposed between an outer core portion of the magnetic core, the outer core portion being disposed outside the wound portion, and an end surface of the wound portion,
wherein the side wall portions of the sensor housing portion are integrally provided in the end surface connecting member.

\* \* \* \* \*